United States Patent
Larsen et al.

(10) Patent No.: US 10,981,163 B2
(45) Date of Patent: Apr. 20, 2021

(54) METHOD AND SYSTEM FOR HYDROPHOBIC COATING OF MICROFLUIDIC CHIPS

(71) Applicant: ABS Global, Inc., DeForest, WI (US)

(72) Inventors: John Larsen, Verona, WI (US); Yu Zhou, Ridgewood, NJ (US); Zheng Xia, DeForest, WI (US)

(73) Assignee: ABS GLOBAL, INC., DeForest, WI (US)

( * ) Notice: Subject to any disclaimer, the term of this patent is extended or adjusted under 35 U.S.C. 154(b) by 265 days.

(21) Appl. No.: 15/702,452

(22) Filed: Sep. 12, 2017

(65) Prior Publication Data

US 2018/0126376 A1 May 10, 2018

Related U.S. Application Data (60) Provisional application No. 62/393,624, filed on Sep. 12, 2016.

(51) Int. Cl.
| | |
|---|---|
| *B01L 3/00* | (2006.01) |
| *C09D 5/00* | (2006.01) |
| *C09D 129/10* | (2006.01) |
| *B01L 3/02* | (2006.01) |

(52) U.S. Cl.
CPC ... *B01L 3/502707* (2013.01); *B01L 3/502715* (2013.01); *C09D 5/00* (2013.01); *C09D 129/10* (2013.01); *B01L 3/0268* (2013.01); *B01L 2200/0636* (2013.01); *B01L 2200/141* (2013.01); *B01L 2300/089* (2013.01); *B01L 2300/0816* (2013.01); *B01L 2300/0864* (2013.01); *B01L 2300/12* (2013.01); *B01L 2300/163* (2013.01); *B01L 2300/165* (2013.01)

(58) Field of Classification Search
CPC ......... B01L 3/502707; B01L 2300/165; B01L 2300/163; B01L 2300/0816; B01L 2300/089; B01L 3/502715; B01L 2300/12; B01L 3/0268; B01L 2200/141; B01L 2300/0864; B01L 2200/0636; C09D 5/00; C09D 129/10
See application file for complete search history.

(56) References Cited

U.S. PATENT DOCUMENTS

| | | | |
|---|---|---|---|
| 2003/0068646 A1* | 4/2003 | Singh | B01J 19/16 435/7.1 |
| 2004/0166504 A1 | 8/2004 | Rossier et al. | |
| 2004/0206399 A1* | 10/2004 | Heller | H01J 49/0018 137/375 |
| 2006/0105453 A1 | 5/2006 | Brenan et al. | |
| 2006/0252047 A1 | 11/2006 | Ekstrom et al. | |

(Continued)

OTHER PUBLICATIONS

International Search Report and Written Opinion for Application Serial No. PCT/IP2017/001289, dated Apr. 3, 2018, 21 pages.

(Continued)

*Primary Examiner* — Rebecca M Fritchman
(74) *Attorney, Agent, or Firm* — Nguyen Tarbet LLC (57) ABSTRACT

This disclosure concerns a method of providing a hydrophobic coating on a microfluidic chip that promotes the discrete flow of at least one liquid. It includes applying the hydrophobic coating onto an area of the microfluidic chip. The disclosure further includes a microfluidic chip that provides discrete flow of at least one liquid.

17 Claims, 9 Drawing Sheets

(56) References Cited

U.S. PATENT DOCUMENTS

2009/0281250 A1* 11/2009 DeSimone ............ B29C 66/723
                                                              525/418
2014/0287243 A1    9/2014  Weber et al.
2015/0064694 A1    3/2015  Sadri et al.
2015/0114093 A1    4/2015  Appleyard et al.

OTHER PUBLICATIONS

Sklodowaka, A., Wozniak, M., Matlakowska, R., "The method of contact angle measurements and estimation of work of adhesion in bioleaching of metals." Biol. Proc. Online, 1 (3), 114-121, 1999.
Invitation to Pay Additonal Fees for Application Serial No. PCT/IP2017/001289, dated Jan. 26, 2018, 17 pages.
International Bureau, "International Preliminary Report on Patentability," issued in connection with International Patent Application No. PCT/IB2017/001289, dated Mar. 21, 2019, 12 pages.

* cited by examiner

METHOD AND SYSTEM FOR HYDROPHOBIC COATING OF MICROFLUIDIC CHIPS

CROSS-REFERENCE TO RELATED APPLICATION

Pursuant to 35 U.S.C. §§ 119 and/or 120, and any other applicable statute or rule, this application claims the benefit of and priority to U.S. Ser. No. 62/393,624, filed on Sep. 12, 2016, the disclosures of which is incorporated by reference in its entirety.

BACKGROUND OF THE INVENTION

Field

This application relates generally to coating of microfluidic chips and particularly, but not by way of limitation, hydrophobic coating of microfluidic chips to promote discrete flow from the outlet when a liquid passes through a chip.

Due to the hydrophilicity of various materials common in microfluidic chip manufacturing, it is difficult to make a microfluidic chip that results in discrete flows from multiple outlets when a liquid is passed through the chip. To promote discrete flows from the outlets of a single chip, a modification to the exterior faces of the microfluidic chip can be performed to modify the hydrophobicity of the microfluidic chip. The resulting effect from the modification of hydrophobicity is the promotion of discrete flows from the outlets of the microfluidic chip.

BRIEF DESCRIPTION OF THE INVENTION

An embodiment of the invention is a hydrophobic coating for a microfluidic chip that promotes the discrete flow of a liquid from an outlet of the microfluidic chip, wherein the liquid contains one or more living cells and the coating in contact with the liquid is compatible with the survivability of the living cells. In other words, the hydrophobic substance is biocompatible.

Definitions

As used herein, the following terms have the meanings indicated.

"Hydrophobic," with respect to the coating, means substantially forming a barrier to a liquid solution. In an embodiment, the liquid solution comprises predominantly water.

"Microfluidic chip" means a set of micro-channels etched or molded into a material (e.g., glass, silicon or polymer such PDMS, polydimethylsiloxane). The micro-channels are connected together in order to achieve a desired feature (e.g., mix, pump, sort, or control the biochemical environment).

"Wax" means any substance consisting of hydrocarbons or esters of fatty acids that are insoluble in water.

"Silanization," with respect to the coating, means covering of a surface with organofunctional alkoxysilane molecules.

"Temporary," with respect to the coating, means coating that can be washed off with water and detergent.

""Semi-permanent," with respect to the coating, means coating that is attached to the surface by a covalent bond and can be removed with solvent.

"Permanent," with respect to the coating, means coating that is physically attached to the surface and cannot be substantially removed by water, detergent, or solvent.

"Nanoparticles" are particles generally between 1 and 100 nanometers (nm) in size (diameter). In nanotechnology, a particle is defined as a small object that behaves as a whole unit with respect to its transport and properties. Particles are further classified according to diameter.

"Cytop 809M," (MSDS Number: Z-1590HCS) with respect to the coating, is a product of Asahi Glass AGC Group (1-5-1, Marunouchi, Chiyoda-ku, Tokyo 100-8405, Japan). It is an amorphous, low molecular weight, fluoropolymer with high transparency. It is also categorized as a perfluorinated solvent. It comprises the following components: perflurotributylamine (CAS No. 311-89-7; at about 85-99%) and poly-1,1,2,4,4,5,5,6,7,7-decafluoro-3-oxa-1,6-heptadiene (CAS No. 101182-89-2; at about 1-15%).

DETAILED DESCRIPTION OF THE INVENTION

This disclosure concerns a method of providing a hydrophobic coating on a microfluidic chip that promotes the discrete flow of at least one liquid. It includes applying the hydrophobic coating onto an area of the microfluidic chip. The disclosure further includes a microfluidic chip that provides discrete flow of at least one liquid.

Common materials to make microfluidic chips, such as glass, borosilicate, fused silica, quartz, and certain polymers, are either very hydrophobic or very hydrophilic in nature. However, the hydrophilicity of the material can make having discrete outlet flows from a chip difficult to achieve. Therefore, it can be advantageous to modify the hydrophilic character of the exterior surface to promote discrete flows from the outlets of the microfluidic chip.

For instance, in the case of a glass chip with an aqueous solution flowing through the chip, the resulting contact angle between the solution and the solid substrate is approximately 30-50°.[1] If a microfluidic chip is in the vertical position with the outlets facing straight down, it is still possible for the aqueous solution to wick up the external face of the chip. If there are multiple outlets that are desired to be kept separate, these outlet flows may merge together. In order to prevent the merging of outlet flows, it may be necessary to modify the external surface of the chip to create a larger contact angle.

The modification may come in the form of a temporary, semi-permanent, or permanent modification. A temporary modification may be, but not limited to, a coating that is easily removed through physical methods. Such examples include a wax coating, nanoparticle deposition, and non-covalently bound molecules. A semi-permanent modification may be, but not limited to, a covalently bound molecule, such as a silanization treatment of a glass surface. A permanent solution may be, but not limited to, physically modifying the microfluidic chip surface through the creation of micron sized pillars to alter the hydrophobic nature of the surface of the microfluidic chip.

The alteration of the hydrophobic nature of the microfluidic chip surfaces also allows for "channels" to be made on the surfaces of the chip. The hydrophilic/hydrophobic modifications can act as guides to direct fluids along the external surface of the microfluidic chip. These can either be used to mix outlets and flows or keep them separate.

The modifications described above can be applied to the whole microfluidic chip. Alternatively, the modification may be applied to a portion of the microfluidic chip, allowing the modification to act as a barrier.

The modifications described above are an improvement over the existing device as they allow for discrete flows to come off of a microfluidic chip. Without the modification, the outlet flows may merge together resulting in either a diluted product from a desired outlet or a deleterious reaction from components that were not supposed to come into contact.

The commercial potential for the invention above is large. Being able to keep the various outlet flows separate allows for a significant reduction of the dilution of the raw product. By keeping the dilution as low as possible, the cost of consumables for downstream processing is kept to a minimum. These consumables are a major driver of COGs for the production of the product being manufactured.

At least one aspect of the present technology is at least one hydrophobic coating, composition or a hydrophobic substance that promotes the discrete flow of one or more liquids from one or more outlets (also known as tines) of a microfluidic chip. The hydrophobic coating, composition or substance if it is to be in contact with at least one liquid having one or more living cells, such as sperm cells, must be compatible to the survivability of those living cells. In other words, in at least some of the embodiments of the present technology, the hydrophobic substance, composition or coating is biocompatible. In other embodiments, it should be appreciated by those skilled in the art that the coating, substance or composition of the present technology can be utilized in other applications ranging from chemical uses to that of pharmaceutical applications, among others. Additional applications in other arts, fields and industries are also envisaged. To illustrate, some Examples of the present technology include, but are not limited to at least one temporary hydrophobic coating, composition, or substance of the present technology including, but not limited to at least one wax coating, at least one nanoparticle deposition, at least one non-covalently bound molecule, combinations thereof, or derivatives thereof. Alternatively, a further example of at least one semi-permanent hydrophobic coating, composition or substance of the presently claimed technology includes, for example, but is not limited to at least one covalently bound molecule, such as an organofunctional alkoxysilane molecule, among others.

Further, the presently claimed technology can also include silanization, which can include, for example, one or more applications of at least one organofunctional alkoxysilane molecule(s) on at least one surface such as glass surface. It should be appreciated that application of the presently described and claimed technology may also be applied to other surfaces depending upon the field or application desired. Additionally, in other embodiments of the presently claimed technology there is provided at least one example of a permanent hydrophobic coating, composition, or substance which can include one or more micron sized pillars that can alter the hydrophobic nature of the surface of the microfluidic chip. The hydrophobic coatings, compositions, or substances that can be applied to or be a part of or alternatively the whole surface of the microfluidic chip. Thus, one of skill in the art will appreciate that the presently described and claimed coating, composition, or substance technology can be applied in to or be a part of a portion of the microfluidic chip, such as the outlet portion, component. For example, the presently claimed and described technology can be applied to an entire or portion of an outlet portion, tine, or the like of at least one microfluidic chip.

Another aspect of the presently claimed and described technology is at least one method of applying or including the hydrophobic coating or a hydrophobic substance on a microfluidic chip that promotes the discrete flow of at least one liquid which can be a chemical fluid, biological fluid, biocompatible fluid, pharmaceutical fluid, industrial fluid and the like. The application of the coating, composition, or substance could be one time or a plurality of times depending upon the substance utilized in connection or communication with the coating, composition or substance of the present technology. It should also be appreciated by those skilled in the art that at least one product produced by the process of the presently claimed technology is also envisaged.

A further aspect of the present application is a microfluidic chip coated with at least one hydrophobic coating, composition, or substance of the presently claimed technology. Alternatively, it is also envisaged a microfluidic chip made by the process of applying at least one or more temporary or semi-permanent hydrophobic coatings, compositions, or substances including, but not limited to at least one wax coating, at least one nanoparticle deposition, at least one non-covalently bound molecule, a covalently bound molecule, such as organofunctional alkoxysilane molecule, combinations thereof and derivatives thereof. Moreover, a microfluidic chip could be made by applying permanent hydrophobic coatings, compositions, or substances including micron sized pillars that can alter the hydrophobic nature of the surface of the microfluidic chip.

Moreover, there is also envisaged for the presently claimed technology at least one microfluidic chip lined, coated, covered, or the like with at least one hydrophobic coating, composition or substance of the present technology made by at least one of the processes of the present technology involving at least the step of applying at least one semi-permanent hydrophobic coating or substance including a covalently bound molecule, such as at least one organofunctional alkoxysilane molecule. Alternatively, another embodiment of this aspect can be at least one microfluidic chip coated with at least one hydrophobic coating or substance made by the process of applying or adding a permanent hydrophobic coating, composition, or substance that includes one or more micron sized pillars that can alter the hydrophobic nature of the surface of the microfluidic chip. It should be appreciated that this aspect of the presently described and claimed technology can be utilized in the biotechnological, pharmaceutical, chemical, electrical, mechanical arts, among others.

Although the invention has been explained with respect to an embodiment, it is to be understood that many other possible modifications and variations can be made without departing from the spirit and scope of the invention as herein described.

Further, in general with regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Moreover, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

Lastly, all defined terms used in the application are intended to be given their broadest reasonable constructions consistent with the definitions provided herein. All undefined terms used in the claims are intended to be given their broadest reasonable constructions consistent with their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

Example 1 Chip Hydrophobic Coating Procedure

Prior to use, glass chips are cleaned by ultrasonicating in DI water to remove any water soluble contaminate or large debris from the outer surface of the chip. Glass chips are removed from DI water. Excess water is wiped off with lens paper. and water is blown from channels using house compressed air.

CytoP coating solution (e.g., CytoP 809M) is warmed to room temperature about one hour before use.

Figure 1:
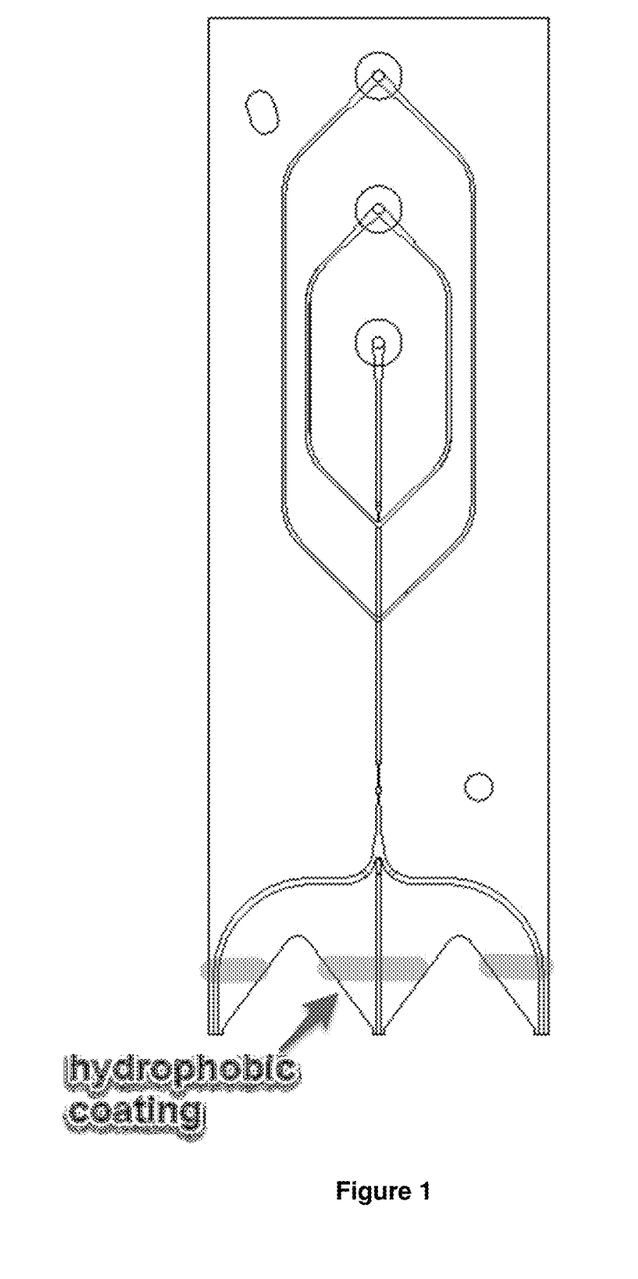
FIG. 1 schematically depicts hydrophobic coatings deposited at the surface of the glass chip near outputs, which prevents liquid from wicking upward from an output and merging with another output.
Figure 2:
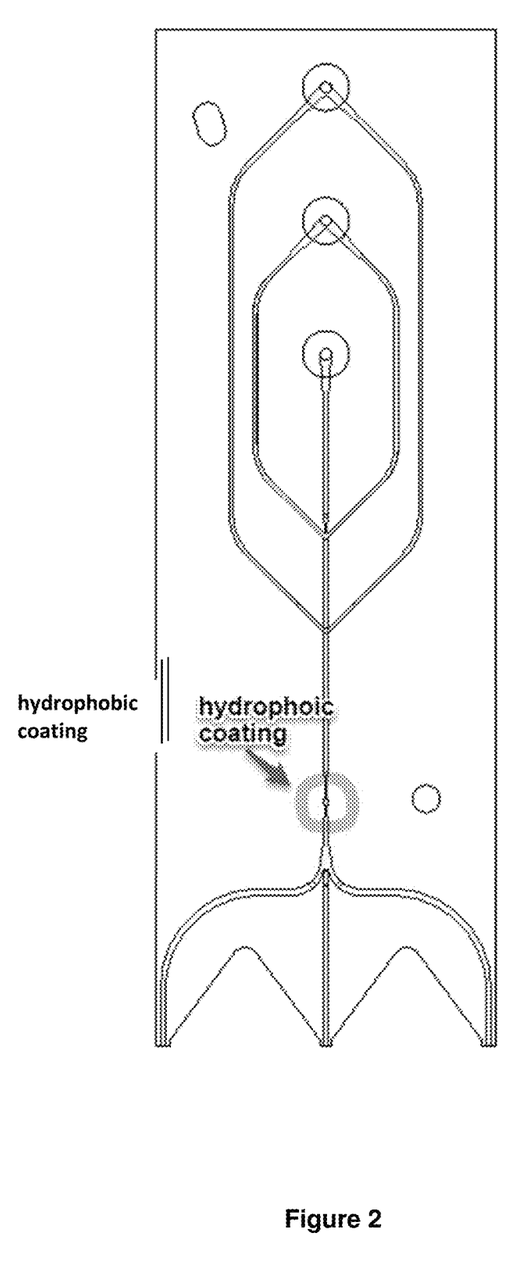
FIG. 2 schematically depicts hydrophobic coating deposited on glass chip surface around the detection window. The coating can prevent liquid spills from creeping into the enclosed area, which will affect either excitation beam or fluorescence emission.
Figure 3:
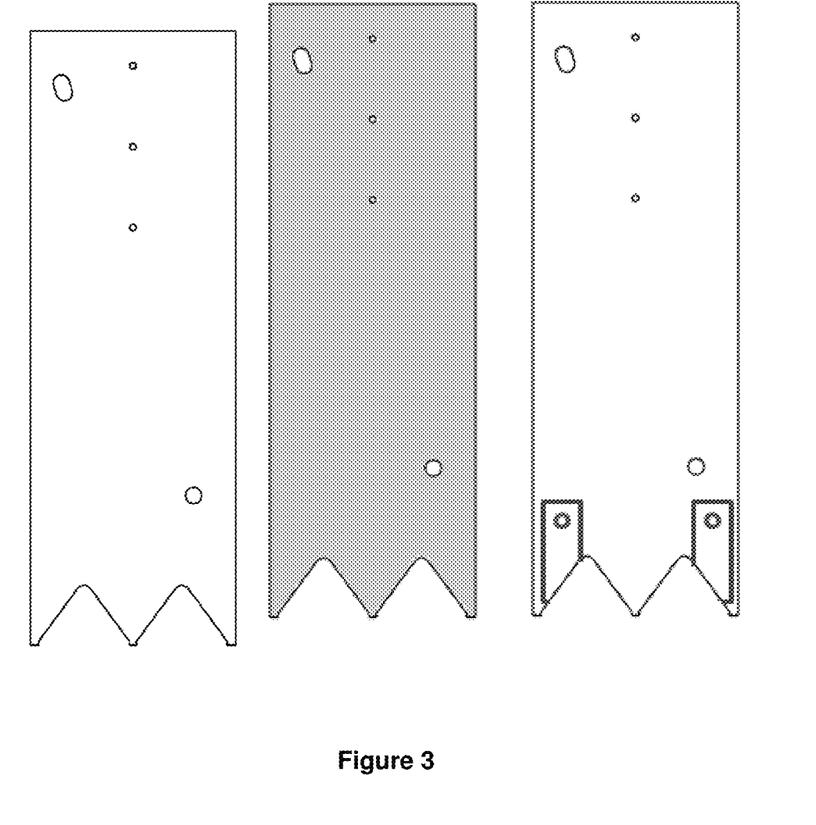
FIG. 3 schematically depicts an uncoated chip (left), a coated chip (depicted in shade, middle), and a chip with coatings that act as channels to guide the droplets (depicted as a rectangular barrier near opening; right).
Figure 4:
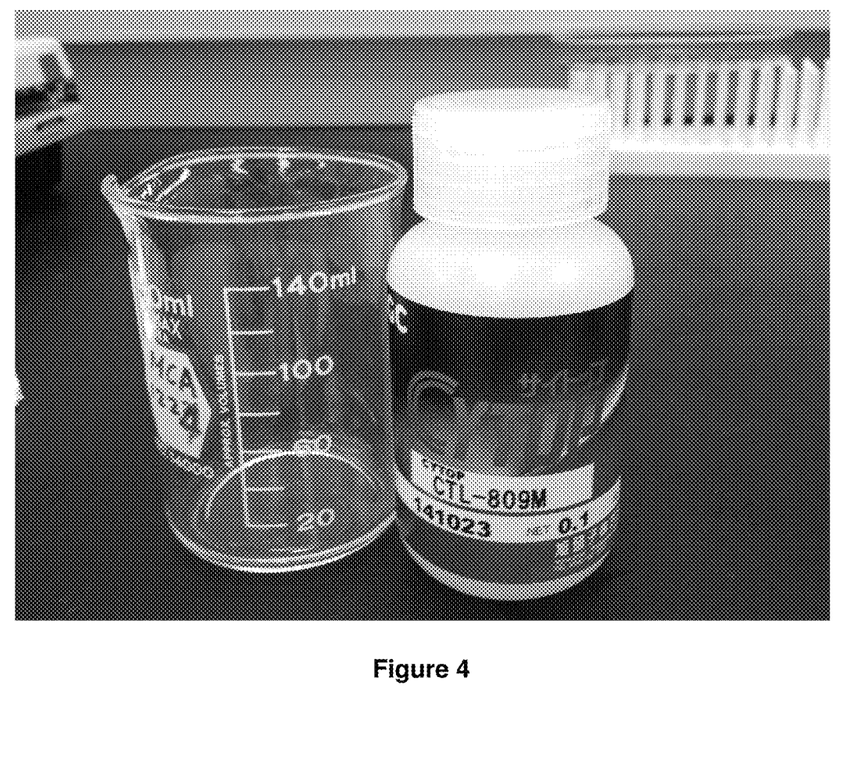
FIG. 4 shows a glass beaker containing CytoP 809M solution.

Place about 2 mL of Cytop 809M in a glass beaker (140 ml or smaller size, see FIG. 4). In the alternative, 35 mm diameter by 10 mm height glass petri dish also works for this purpose to hold Cyto 809M. Dip microswab in the Cytop 809M and apply to the chips at the side outlet regions. See FIG. 5 for coating application region. Coat the two sides (front, back, and thin edges).

Turn on a heater, such as a hot plate and adjust the temperature to about 55° C. Then, carefully apply the coating to the region indicated in FIG. 5 with an applicator, such as a micro cotton swab on one side of glass chip first. Do not coat all sides of the chip at this time, and only do one of the faces. The outlet end of the chip slightly tilt to prevent coating solution to spread. (see FIG. 6).

The coating should be about 1 mm away from the end of the tip to prevent coating solution filling into the micro channel by capillary force. Coating of the central sample outlet and its surrounding region should be avoided (see FIG. 5).

Figure 7:
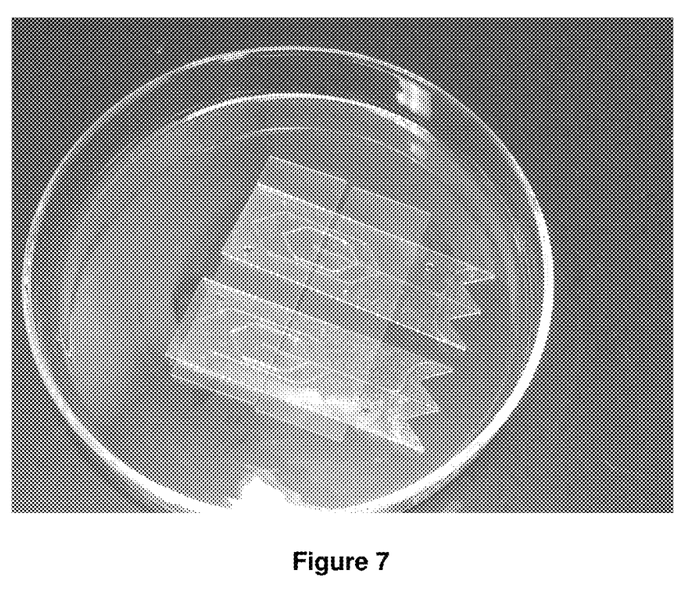
FIG. 7 shows two glass chips placed on glass slides in the 100 mm diameter petri dish.
Figure 8:
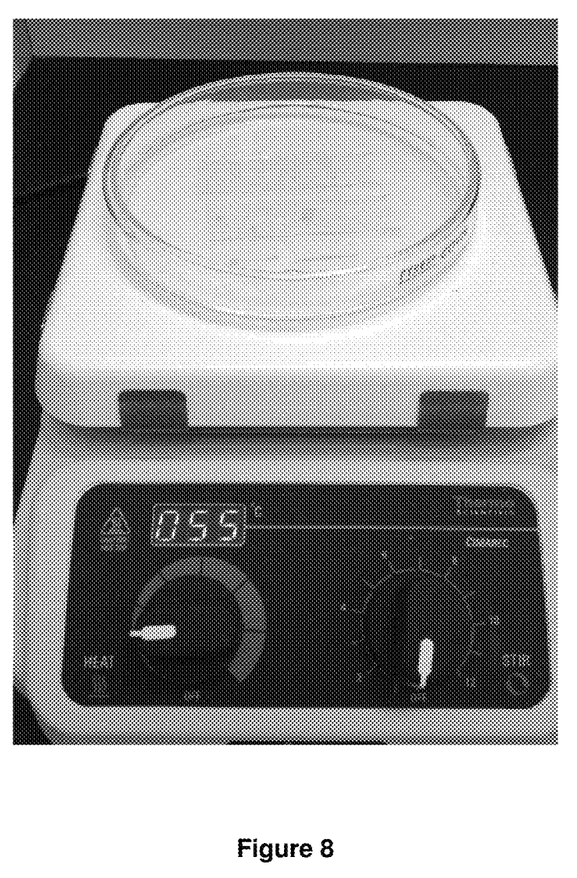
FIG. 8 shows petri dish with the two glass chips on a hot plate at 55 deg C. for pre-baking coating on one side.

After one side coating is done, place the coated chip onto top of two glass slides in a container, such as a petri dish, with tweezers, shown in FIG. 7. Then, place the whole petri dish on the top of the heater, such as the hot plate, to pre-bake the coating on the coated side around 55° C. (see FIG. 8). This procedure can help to efficiently prevent excessive amount of coating solution falling or forming some tiny droplets on the backside of the glass chip.

There are some clearance between the glass slides and coated region of the glass chips. The coating material will be fully cured at the bake temperature and works well as epoxy to bond glass layers.

After about 3-5 minutes, take the glass chips out with tweezers and follow the same steps to coat the other side and thin edge of the glass chips. Then, cover the petri dish and bake for about 1 hour.

Ramp the hot plate from about 55° C. to about 105° C. for about 20 min, about 155° C. for about 20 min, about 205° C. for about 20 min. Bake at about 205° C. for about another extra 50 min. Then, turn off the heat and carefully transfer the petri-dish to a cool area in the chemical hood and let it cool down.

Once cooled, inspect the chips for any blocked outlets under microscope. If any outlet channels are blocked, use a projection or a needle, such as an acupuncture needle with diameter of about 120 μm, can be used to open up the outlet channel and then place in the ultrasonicator to clean the residual debris. Finally, compressed air is used to blow the water and debris inside the channel.

Figure 9:
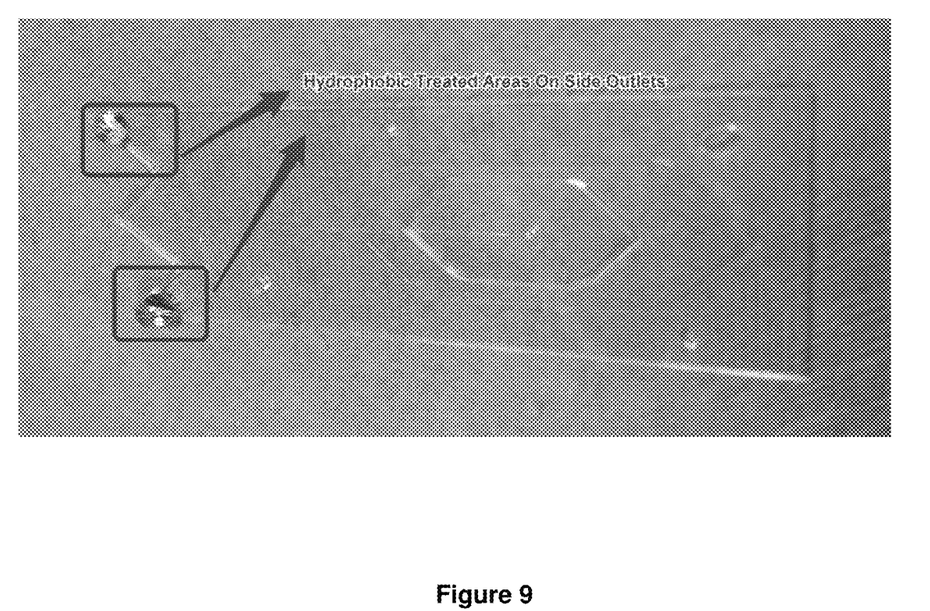
FIG. 9 shows 100 µl Di water on the hydrophobic coated outlet region.

Finally, a pipette is used to dip about 100 μL DI water and dripped on the two coated outlet tips and observation is made the contact angle for the hydrophobic coating effect, see FIG. 9.

Example 2 Chip Hydrophobic Coating Procedure

Power on the convection oven by pressing the power button. Set the temperature to about 55° C. with fan set to the lowest speed and damper fully closed.

Use a dispenser, such as a pipette, place about 2-3 drops of Cytop 809M into a container, such as a weigh boat.

Figure 5:
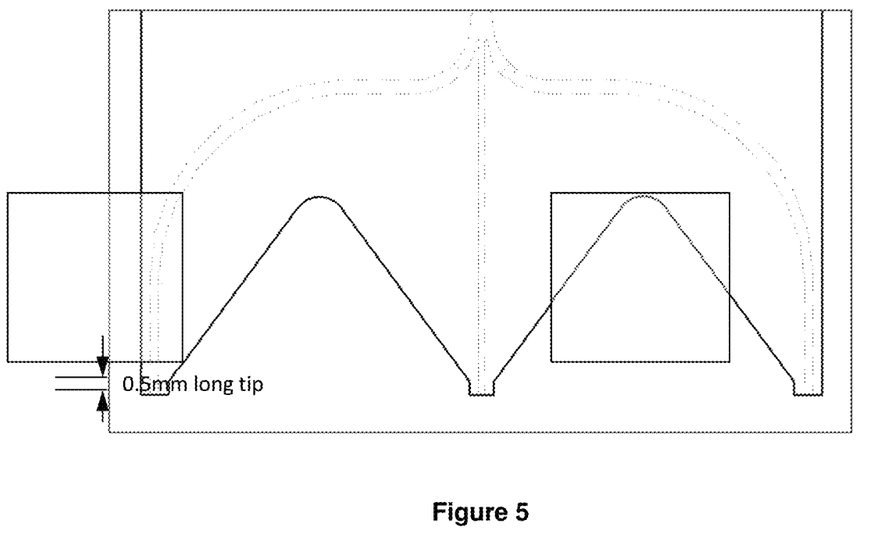
FIG. 5 shows the coating region on the two side outlets about 1 mm away from the tip (the length of the tip is about 0.5 mm).
Figure 6:
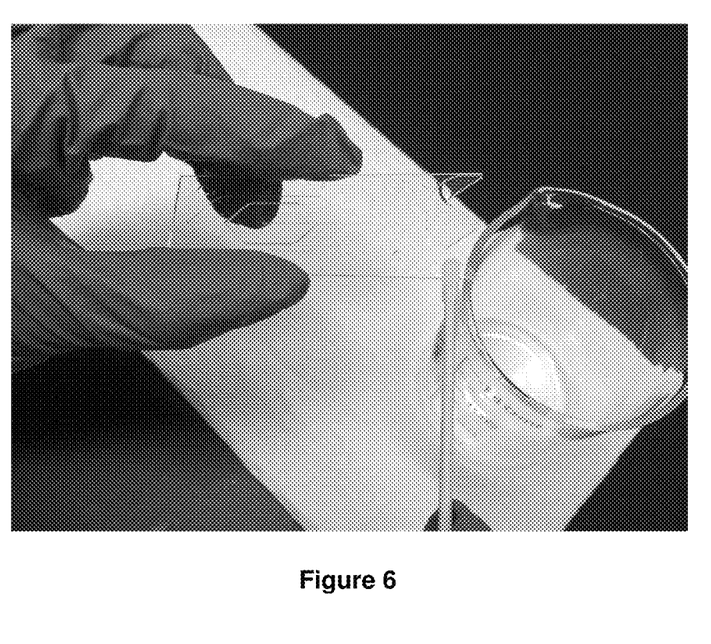
FIG. 6 shows application of hydrophobic coating on the two side outlets of the glass chip.

Carefully remove the chip from its container. Use a swab to apply the coating onto the tines of the chip as shown in FIG. 5 being careful not to get any coating within about 1-2 mm of the side outlets. Ensure the edges of the chip are coated.

Place the chip on the support bar in the petri dish being careful not to allow the coating to touch anything.

When all the chips have been coated, carefully move the petri dishes to the oven. Close the door and select temperature #4 (Thermo Scientific convection oven). The program starts automatically and takes approximately 3 hours to complete. Allow the chips to cool overnight before removing them from the oven.

After the baking is complete, carefully remove the petri dishes. Inspect the chips before placing them back into the containers.

REFERENCES

1. Sklodowaka, A., Wozniak, M., Matlakowska, R., "The method of contact angle measurements and estimation of work of adhesion in bioleaching of metals." Biol. Proc. Online, 1 (3), 114-121, 1999.

The invention claimed is:

1. A method of providing a hydrophobic coating on a microfluidic chip that prompts the discrete flow of at least one liquid comprising:
   applying the hydrophobic coating onto an outlet region of the microfluidic chip, wherein the hydrophobic coating promotes discrete flow of the liquid with respect to the outlet region of the microfluidic chip and isolates the said liquid from contacting liquids from another outlet;
   wherein the outlet region comprises at least one channel extending therethrough and the hydrophobic coating is applied 1-2 mm away from a terminal portion of the outlet region such that the terminal portion of the outlet region is uncoated, and the uncoated terminal area is less than 10 mm square, and the hydrophobic coating does not contact any interior of the at least one channel, and the uncoated terminal portion does not contact any other uncoated terminal portion of other outlet regions.

2. The method of claim 1, wherein the hydrophobic coating is a temporary coating selected from the group consisting of a wax, a nanoparticle, a non-covalently bound molecule, and a combination thereof.

3. The method of claim 1, wherein the hydrophobic coating is a semi-permanent coating selected from the group consisting of organofunctional alkoxysilane molecule, another covalently bound molecule, and a combination thereof.

4. The method of claim 1, wherein the hydrophobic coating is a permanent coating comprising a micron sized pillar.

5. The method of claim 1, wherein the hydrophobic coating is biocompatible with a cell.

6. The method of claim 1, wherein the hydrophobic coating comprises a fluoropolymer.

7. The method of claim 6, wherein the fluoropolymer comprises perfluorotributylamine and poly-1,1,2,4,4,5,5,6,7,7-decafluoro-3-oxa-1,6-heptadiene.

8. The method of claim 7, wherein the fluoropolymer comprises about 85-99% of perfluorotributylamine and about 1-15% of poly-1,1,2,4,4,5,5,6,7,7-decafluoro-3-oxa-1,6-heptadiene.

9. The method of claim 1, further comprising:
   heating the microfluidic chip; and
   cooling the microfluidic chip.

10. The method of claim 9, wherein the heating the microfluidic chip further comprises heating at 55° C. and then at 205° C.

11. The method of claim 10, wherein the heating at 55° C. and then at 205° C. further comprises stepwise heating at about 55° C., then at about 105° C., then at about 155° C., and then at about 205° C.

12. The method of claim 11, wherein the heating at about 105° C. is for about an hour, the heating at about 105° C. is for about 20 min, the heating at about 155° C. is for about 20 min, and the heating at about 205° C. is for at least about 20 min.

13. The method of claim 1, further comprising:
   clearing the interior or an open end of the at least one channel from any undesired blockage by the hydrophobic coating with a projection.

14. A microfluidic chip that provides discrete flow of at least one liquid comprising:
   a hydrophobic coating applied to an outlet region of the microfluidic chip, wherein the hydrophobic coating promotes discrete flow of a liquid with respect to an outlet region of the microfluidic chip and isolates the said liquid from contacting liquids from another outlet, wherein the outlet region comprises at least one channel extending therethrough and the hydrophobic coating is applied 1-2 mm away from a terminal portion of the outlet region such that the terminal portion of the outlet region is uncoated, and the uncoated terminal area is less than 10 mm square, and the hydrophobic coating does not contact any interior of the at least one channel, and the uncoated terminal portion does not contact an other uncoated terminal portion of other outlet regions.

15. The microfluidic chip of claim 14, wherein the hydrophobic coating comprises a fluoropolymer.

16. The microfluidic chip of claim 15, wherein the fluoropolymer comprises perfluorotributylamine and poly-1,1,2,4,4,5,5,6,7,7-decafluoro-3-oxa-1,6-heptadiene.

17. The microfluidic chip of claim 14, wherein the fluoropolymer comprises about 85-99% of perfluorotributylamine and about 1-15% of poly-1,1,2,4,4,5,5,6,7,7-decafluoro-3-oxa-1,6-heptadiene.

* * * * *